Figure 1:
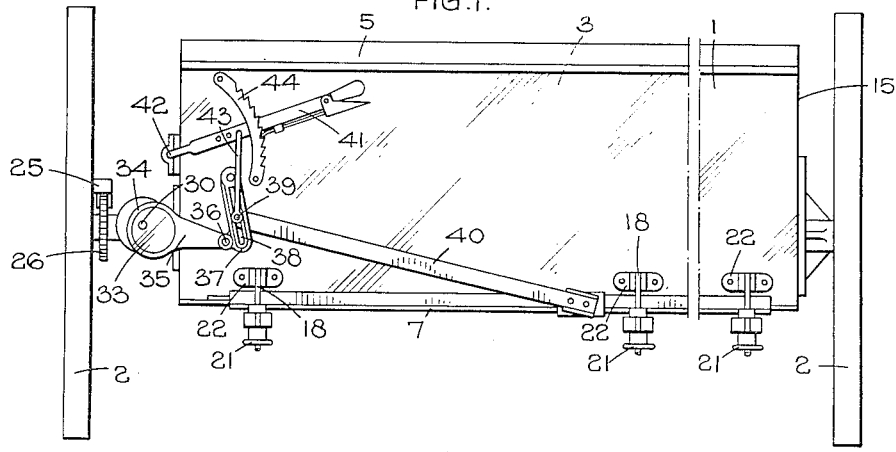

Oct. 27, 1931.  J. BAMFORD ET AL  1,829,627
MACHINE FOR DISTRIBUTING MANURE OR OTHER MATERIAL
Filed Dec. 18, 1929  2 Sheets-Sheet 1

Inventors:
Joseph Bamford
Cyril J. Bamford
By Richard E. Babcock
Attorney

Patented Oct. 27, 1931

1,829,627

UNITED STATES PATENT OFFICE

JOSEPH BAMFORD AND CYRIL JOSEPH BAMFORD, OF UTTOXETER, ENGLAND

MACHINE FOR DISTRIBUTING MANURE OR OTHER MATERIAL

Application filed December 18, 1929, Serial No. 415,087, and in Great Britain January 12, 1929.

This invention relates to machines for distributing manure or other material over land, and relates to that kind of machine which includes a box or hopper mounted upon supporting wheels, and adapted to be drawn over the land, the bottom of the box being provided with a plurality of grids, the openings in which are alternately brought into and out of register.

The object of the present invention is to provide a generally improved construction of machine by which an even distribution of the material over the land can be effected, and further objects of the invention will become apparent as this specification proceeds.

Figure 2:
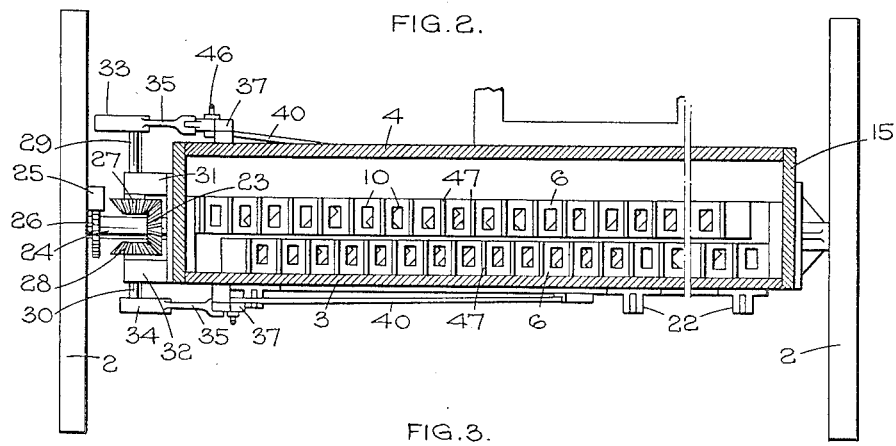
Figure 3:
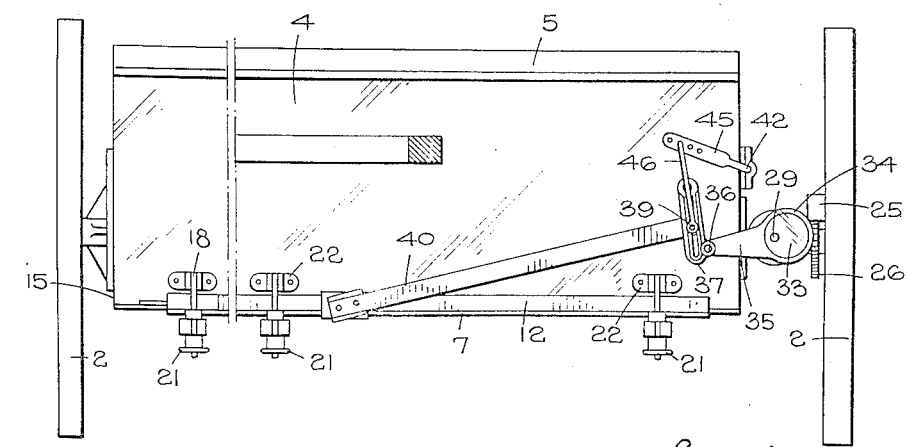
Figure 4:
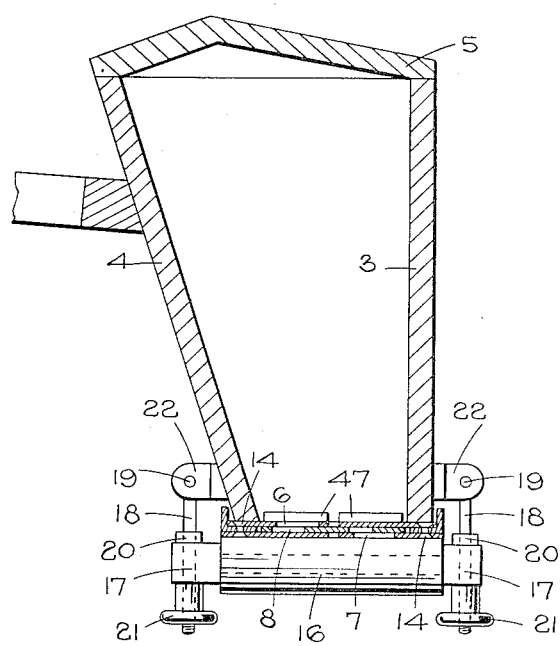
Figure 5:
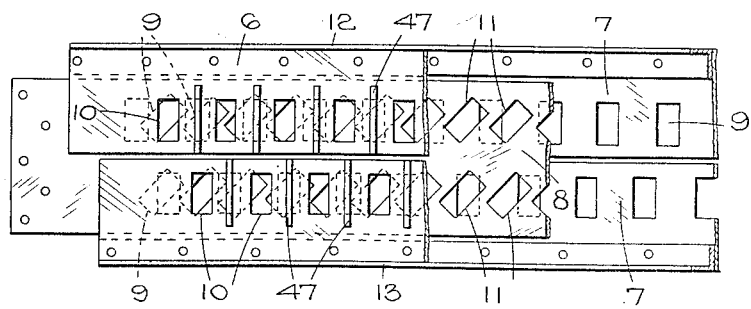

Referring to the drawings:

Figure 1 is a rear view;
Figure 2 is a sectional plan view;
Figure 3 is a front view;
Figure 4 is a sectional side view, and
Figure 5 is a plan view of the grids.

In the construction illustrated, the appliance consists of a box 1 having supporting wheels 2. The box is shown with one vertical side 3 and one inclined side 4 and with a removable lid 5.

Controlling the outlet of material from the bottom of the box are three grids 6, 7 and 8.

These three grids are arranged in contact with each other, and all of them are provided with openings.

The openings 9 in the lower grid are staggered in relation to the openings 10 in the upper grid, so that these openings do not overlap. In other words, the openings 9 in the lower grid are covered by those portions of the upper grids which are disposed between the openings 10. The edges of the openings 10 may be directly over the edges of the openings 9 in the lower grid.

The openings 11 in the fixed or central grid 8 may be disposed obliquely, as shown in Figure 5, or they may be disposed in any other fashion.

Each of the grids 6 and 7 is made in two parts, the division being longitudinal as shown.

The two grid parts 6, 7 disposed at one side are connected together by an angle section member 12, while the remaining parts 6, 7 at the other side of the box are connected by the angle 13, the angles and grid parts being secured together by rivets 14, and the arrangement being such that the two grid parts connected to the angle 12 always move together, and the other two grid parts connected to the angle 13 also move together.

The central grid 8 is connected to the ends 15 of the box and never moves while the grid parts 6, 7 are given a reciprocating motion, the arrangement preferably being such that the two grid parts carried by the angle 12 move in the opposite direction from the two grid parts carried by the angle 13.

For retaining the grids in position while permitting them to slide, we provide rollers 16 mounted upon pins which are carried in blocks 17, these blocks being supported upon screws 18 pivoted at 19, the screws being provided with shoulders 20 and with nuts 21, the arrangement being such that on slackening the nuts 21 the screws 18 can be moved outwardly on their pivots 19 so as to release the rollers 16 and allowing of the removal of the grids for cleaning.

The pivots 19 are carried in brackets 22 on the sides of the box.

For moving the movable grid units, we provide a bevel wheel 23 on a sleeve 24 driven by a pawl 25 engaging a ratchet wheel 26.

Gearing with the bevel wheel 23 are bevel wheels 27 and 28 on shafts 29 and 30, the latter two shafts being supported in bearings 31 and 32 on the box.

The shafts 29 and 30 each carry an eccentric 33 provided with an eccentric strap 34 and rod 35, the rod being pivoted at 36 to a pivoted link 37, the link 37 being slotted at 38 and a pin 39 on a connecting rod 40 engaging in the slot. There are two connecting rods 40 one at the side of the box and one in connection to the angle 12 and the other to the angle section piece 13. The two eccentrics 33 may be set at any convenient angle to each other. We may, for instance, set them at 180° to each other so that the angle pieces 12 and 13 reciprocate but in opposite directions.

The position of the pin 39 in the slot 38 can be adjusted by means of a lever 41 mounted on a shaft 42 and connected to the pin 39 by a link 43, the lever moving over a toothed quadrant 44.

The shaft 42 extends across the end of the box and carries a lever 45 to which is attached a link 46 at the other side of the machine this link being similar to the link 43.

We may provide a rotary agitator extending across the lower part of the box. Alternatively, a number of bars 47 or similar members may be attached to this upper surface of the grid member 6 so as to move with them for the purpose of disturbing the material in the box and to prevent it from forming an immovable bridge against the grids.

Bars similar to the bars 47 may be mounted for reciprocating movement in the opposite direction from the reciprocating movement of the grid immediately beneath them. For instance, one series of bars 47 may be connected to the member 12 disposed at the opposite edge of the hopper while the other series of bars 47 may be connected to the member 13. In this manner the bars 47 will reciprocate in a direction opposite to the direction of movement of the grid immediately beneath them.

In the construction illustrated the grids 6 and 7 are shown as reciprocating lengthwise in the box. If required, the upper and lower moving grids may reciprocate from side to side, i. e. at right angles to the direction shown in the drawings.

In operation, the material passes through the openings 10 in the grid parts 6 to the openings 11 in the fixed grid 8, and when the grid parts 7 have moved into the correct position the material is allowed to drop from the openings 11 through the openings 9 to the ground.

Instead of providing the moving grids with a rectilinear reciprocating movement parallel to the length of the box, either or both may have a rectilinear reciprocating movement at right angles to the length of the hopper or box, or one or both the moving grids may have a rotary motion or a combined reciprocating and rotary motion somewhat relative to the fixed grid, and which motion may be similar to the motion of the coupling rod of a locomotive.

In order to direct the material into the furrows or into definite lines upon the land, we may provide means similar to those described in our British specification No. 293,369, whereby at certain positions across the width of the machine the openings are placed out of action or the flow of material through the lower part of the box is interrupted. This may be effected by fastening blanking out plates to the upper grid or to one of the grids, there being spaces between these blanking out plates so as to allow the flow of material to take place at certain definite positions.

What we claim then is:—

1. A machine for distributing manure or other material of the type specified having a hopper, means adapted to control the discharge of material from said hopper, comprising a stationary grid, a movable upper grid above said stationary grid, a movable lower grid below said stationary grid, said upper and lower grids each being divided longitudinally, means connecting each of the upper grid parts with the lower grid part directly beneath it, and means for reciprocating said upper and lower grid parts, the openings in the upper grid parts being out of register with the openings in the lower grid parts disposed beneath them.

2. A machine for distributing manure or other material of the type specified having a hopper, means adapted to control the discharge of material from said hopper, comprising a stationary grid, a movable upper grid above said stationary grid, a movable lower grid below said stationary grid, said movable grids being closely adjacent said stationary grid, the upper and lower moving grids being divided into a plurality of sections, and means for moving adjacent grid sections in opposite directions to one another.

3. A machine for distributing manure or other material of the type specified having a hopper, means adapted to control the discharge of material from said hopper, comprising a stationary grid, a movable upper grid above said stationary grid, a movable lower grid below said stationary grid, said movable grids being closely adjacent said stationary grid, the upper and lower moving grids being divided into a plurality of sections, the sections of the lower moving grid being disposed below the sections of the upper moving grid, means being provided for connecting each upper grid section to a lower grid section, means for moving adjacent grid sections in opposite directions to one another, means for moving the upper and lower moving grid sections of each connected group together, and the apertures or openings in said upper and lower grids are out of register.

4. A machine for distributing manure or other material of the type specified having a hopper, means adapted to control the discharge of material from said hopper comprising a stationary grid, a movable upper grid above said stationary grid, a movable lower grid below said stationary grid, said movable grids being closely adjacent said stationary grid, the upper and lower moving grids being divided into a plurality of sections, the sections of the lower moving grid being disposed below the sections of the upper moving grid, means being provided for connecting each upper grid section to a lower grid section, means for moving the upper and lower moving grid sections of each connected group together, actuating means for imparting a rectilinear reciprocating movement to each of said groups of grid sections, means for varying the said reciprocating movement, said actuating means deriving motion from the land wheels of the machine, and the apertures or openings in said upper and lower grids are out of register.

5. A machine for distributing manure or other material of the type specified having a hopper, means adapted to control the discharge of material from said hopper comprising a stationary grid, a movable upper grid above said stationary grid, a movable lower grid below said stationary grid, and the apertures or openings in said upper and lower grids are out of register, the apertures in the stationary grid being obliquely disposed relative to the length of the hopper, said movable grids being closely adjacent said stationary grid, the upper and lower moving grids being divided into a plurality of longitudinal sections, the sections of the lower moving grid being disposed below the sections of the upper moving grid, a member connecting each upper grid section to a corresponding lower grid section, means for moving adjacent grid sections in opposite directions to one another, means for moving the upper and lower moving grid sections of each connected group together, comprising a link connected to each of said connecting members, an eccentric or the equivalent adapted to reciprocate each link in turn adapted to impart a rectilinear reciprocating movement to each of said groups of grid sections, means for varying the said reciprocating movement disposed between each of said links and the corresponding eccentric, a shaft on which said eccentrics are mounted and disposed across the end of the hopper, and means for imparting motion to said shaft from the land wheels of the machine.

6. A machine for distributing manure or other material of the type specified having a hopper, means adapted to control the discharge of material from said hopper, comprising a stationary grid, a movable upper grid above said stationary grid, a movable lower grid below said stationary grid, and the apertures or openings in said upper and lower grids are out of register, the openings in the lower moving grid being adapted to be covered by the portions of the upper moving grid between the openings therein, the apertures in the stationary grid being obliquely disposed relative to the length of the hopper, said movable grids being closely adjacent said stationary grid, detachable supporting rollers for said grids, the upper and lower moving grids being divided into a plurality of sections, the sections of the lower moving grid being disposed below the sections of the upper moving grid, a member connecting each upper grid section to a corresponding lower grid section, means for moving adjacent grid sections in opposite directions to one another, means for moving the upper and lower moving grid sections of each connected group together, comprising a link connected to each of said connecting members, an eccentric or the equivalent adapted to reciprocate each link in turn adapted to impart a rectilinear reciprocating movement to each of said groups of grid sections, means for varying the said reciprocating movement disposed between each of said links and the corresponding eccentric, a shaft on which said eccentrics are mounted and disposed across the end of the hopper, and means for imparting motion to said shaft from the land wheels of the machine.

7. A machine for distributing manure or other material of the type specified having a hopper, means adapted to control the discharge of material from said hopper comprising a stationary grid, a movable upper grid above said stationary grid, a movable lower grid below said stationary grid, the apertures or openings in said upper and lower grids are out of register, and agitator bars associated with said upper moving grids and extending across adjacent grids, the bars being adapted to reciprocate with the moving grids with which they are associated and in opposite directions to the grids directly below them and adjacent the grids with which the bars move.

8. A machine of the type specified for distributing manure or other material comprising a hopper, means for controlling the discharge of material from said hopper comprising a stationary grid, a movable grid above said stationary grid, a movable grid below said stationary grid, said movable grids lying closely adjacent the fixed grid, means for reciprocating said upper and lower grids mechanically and in unison, the apertures in the upper and lower grids being out of register whereby a direct passage of the material through the apertures in the three grids is prevented.

9. A machine of the type specified for distributing manure or other material comprising a hopper, means for controlling the discharge of material from said hopper comprising a stationary grid, a movable grid above said stationary grid, a movable grid below said stationary grid, means for reciprocating said upper and lower grids mechanically and in unison, the apertures in the upper and lower grids being out of register, the apertures in the three grids being so arranged so that discharge area of the registering apertures in adjacent grids is substantially constant throughout the to and fro movement of the moving grids whereby a substantially constant and uninterrupted flow of material from the hopper is ensured.

10. A machine of the type specified for distributing manure or other material comprising a hopper, means for controlling the discharge of material from said hopper comprising a stationary grid a movable grid above said stationary grid, a movable grid below said stationary grid, means for reciprocating said upper and lower grids mechanically and in unison, the apertures in the upper and lower grids communicating with the apertures in the fixed grids, the apertures in the upper and lower movable grids being out of register with each other, the three grids lying closely adjacent each other, the material from the hopper passing through the apertures in the upper moving grid into the apertures in the fixed grid, the material being subsequently delivered from the apertures in the fixed grid by way of the apertures in the lower moving grid whereby a substantially constant and uninterrupted flow of material is obtained having a side to side delivery.

In witness whereof we affix our signatures.

JOSEPH BAMFORD.
CYRIL JOSEPH BAMFORD.